United States Patent [19]

Patrick et al.

[11] Patent Number: 4,633,054
[45] Date of Patent: Dec. 30, 1986

[54] RESISTANCE WELDING METHOD

[75] Inventors: Edward P. Patrick, Murrysville; J. Richard Auhl, Monroeville, both of Pa.

[73] Assignee: Aluminum Company of America, Pittsburgh, Pa.

[21] Appl. No.: 583,120

[22] Filed: Feb. 24, 1984

[51] Int. Cl.$^4$ ............................................. B23K 11/16
[52] U.S. Cl. .................................... 219/118; 219/117.1
[58] Field of Search ....................... 219/118, 117.1, 92, 219/91.2

[56] References Cited

U.S. PATENT DOCUMENTS

| | | | |
|---|---|---|---|
| 1,770,540 | 7/1930 | Lunn | 219/118 |
| 3,992,602 | 11/1976 | Ashton | 219/118 X |
| 4,365,134 | 12/1982 | Eager et al. | 219/118 |
| 4,546,229 | 10/1985 | Leone | 219/118 |

FOREIGN PATENT DOCUMENTS

| | | | |
|---|---|---|---|
| 0006252 | 1/1978 | Japan | 219/118 |
| 1199518 | 7/1970 | United Kingdom | 219/118 |

OTHER PUBLICATIONS

Ashton et al, "An Arc-Cleaning Approach for Resistance Welding of Aluminum", Welding Journal (Sep. 1976) pp. 750–757.
Wu, "The Mechanism of Expulsion in Weldbonding of Anodized Aluminum", Welding Research Supplement (Aug. 1977), pp. 238—s–244—s.

Primary Examiner—E. A. Goldberg
Assistant Examiner—C. M. Sigda
Attorney, Agent, or Firm—Daniel A. Sullivan, Jr.

[57] ABSTRACT

A resistance welding method, including the steps of contacting electrodes to two parts to be welded together, faying the two parts at a location to be welded, and passing electrical current between the electrodes and through said location, wherein the improvement comprises, on the parts, a roughened surface means for decreasing heat generation where an electrode makes contact and a uniform coating means at the faying location, the coating means performing the function of generating heat to form a nugget without expulsion.

18 Claims, 15 Drawing Figures

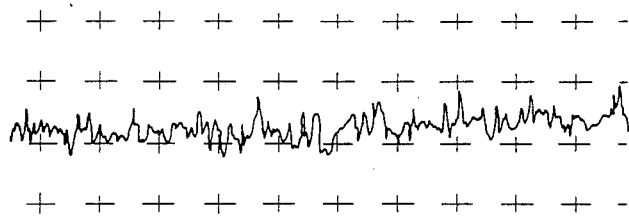
FIG. 3A   Mill finish   RA = 0.33 μm (13 μ")
Horiz. = 50X   Vertical = 5000X
FIG. 3B   Wire brushed   RA = 1.57 μm (62 μ")
Horiz. = 20X   Vertical = 1000X
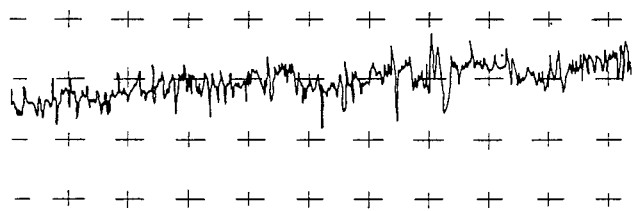
FIG. 3C   Belt sanded   RA = 0.99 μm (39 μ")
Horiz. = 20X   Vertical = 2000X
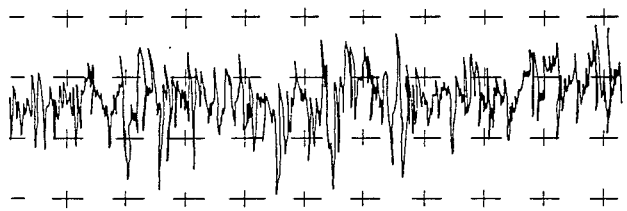
FIG. 3D   Arc cleaned   RA = 0.71 μm (28 μ")
Horiz. = 50X   Vertical = 5000X

RESISTANCE WELDING METHOD

FIELD OF THE INVENTION

This invention concerns the process mechanisms which cause electrode deterioration and inconsistent weld quality when resistance welding, e.g., aluminum auto body sheet. It is also applicable to steel sheet, particularly zinc or aluminum-coated sheet.

BACKGROUND OF THE INVENTION

Lightweight materials for automobile construction draw considerable interest for improving fuel economy while maintaining vehicle acceleration peformance and size utility. A rapid, low-cost, reliable joining or assembly process is required to make aluminum an acceptable material of construction. Spot welding remains one of the more attractive assembly joining methods because it is simple in principle; it does not require operator skill and is a process currently in worldwide use by automobile manufacturers. Two areas of concern surrounding aluminum spot welding are electrode life and inconsistent weld quality. Many investigators have addressed these areas of concern and have offered remedies for one or the other, but the clear solution to both problems has not been advanced.

Aluminum has two attributes which cause it to perform differently than steel in resistance spot welding. First, it is a good conductor, both electrically and thermally, having about one-third the bulk resistivity of steel. Second, it develops a protective oxide coating which acts as a high resistance (or in some cases, as an insulator) on the surface of the aluminum. Little can be done to change the bulk resistivity of aluminum and still maintain desirable mechanical properties.

SUMMARY OF THE INVENTION

An object of the invention is a novel resistance welding method.

This as well as other objects which will become apparent in the discussion that follows are achieved, according to the present invention, by providing a resistance welding method, including the steps of contacting electrodes to two parts to be welded together, faying the two parts at a location to be welded, and passing electrical current between the electrodes and through said location, wherein the improvement comprises, on the parts, a roughened surface means for decreasing heat generation where an electrode makes contact and a uniform coating means at the faying location, the coating means performing the function of generating heat to form a nugget without expulsion.

BRIEF DESCRIPTION OF THE DRAWINGS

FIGS. 3A to 3D are surface roughness profiles.

DESCRIPTION OF THE PREFERRED EMBODIMENTS

A. Surface Objectives

Figure 1:
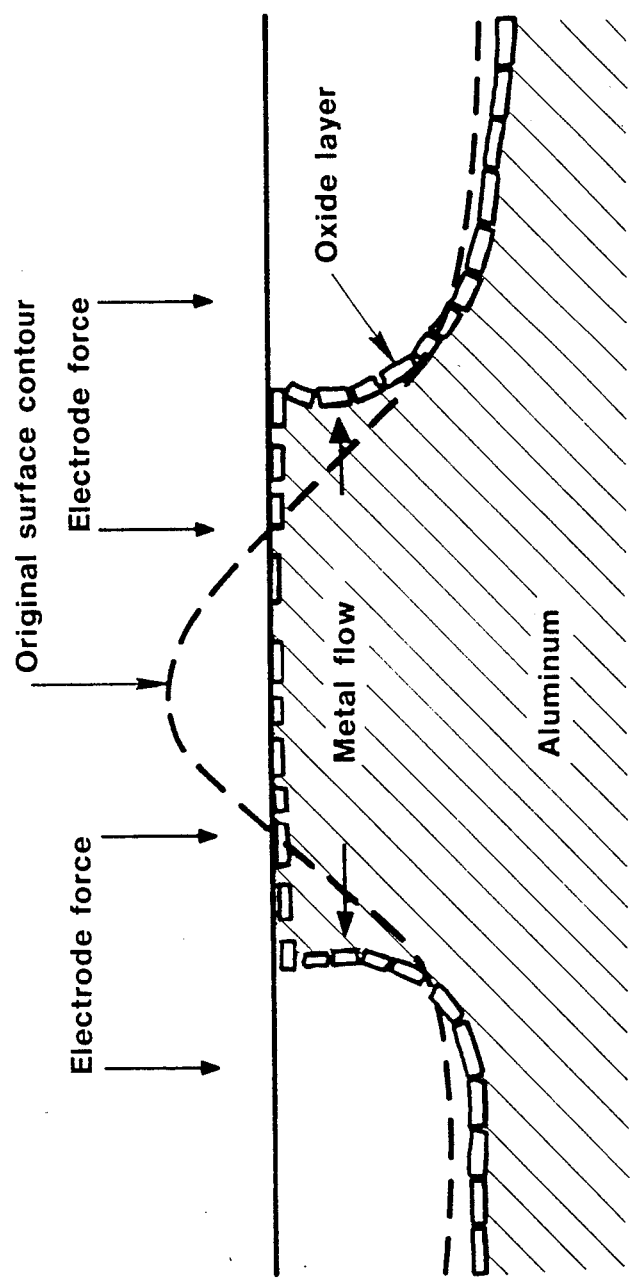
FIG. 1 is a schematic illustration, in cross section, of an electrode being pressed against a peak on an aluminum surface.

1. At Electrode-To-Work Interface—The objective at the electrode-to-work interface is to transfer the current as uniformly as possible and minimize the heat generation at this interface. Since an oxide free surface cannot be achieved in practical aluminum metal applications, an alternative way is to minimize the oxide thickness while roughening the surface at the same time. The surface topography is critical because current transfer depends on local deformation of the metal surface. Wefers showed that surface roughness enhances oxide breakdown (FIG. 1) and increases the tolerance of the contact interface to the oxide thickness. The ideal topography would be one that contains dense pointed peaks so that both uniformity and adequate oxide breakup can be achieved.

2. At the Faying Interface—The objective at the faying interface is to generate heat to form a nugget. Consequently, sufficient surface resistance is required. This resistance must also be uniform to achieve consistent weld quality. By way of illustration, localized areas of scratches or very thin oxide could result in too low a resistance and fail to produce adequate nugget size for a given current. On the other hand, water stains or areas of thick oxide could result in excessive heat and welds with expulsion.

The invention provides an outer surface treated to enhance current transfer in conjunction with a faying surface rreated to provide a finite, but uniform resistance for weld heat generation.

B. Surface Treatments

Figure 2:
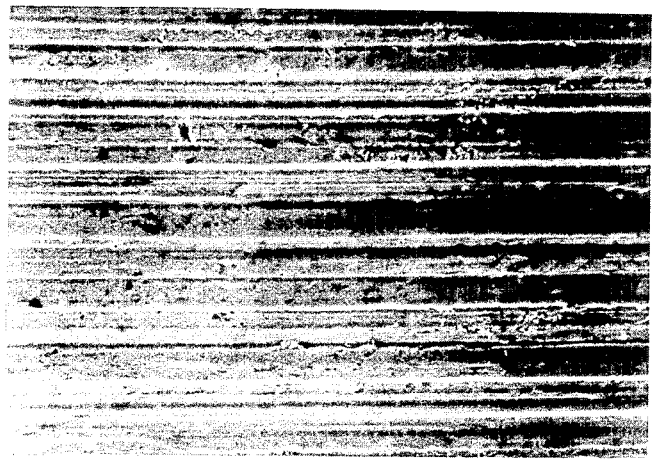
FIGS. 2, 4, 5 and 7 are views at various magnifications of surfaces of metal sheets.

1. Mill Finish Sheet—As received sheet has a typical surface roughness of 0.33 to 0.76 micrometers (10 to 30 microinch) RA overlayed with a variable oxide film. This roughness consists of parallel grooves as shown in FIG. 2 (500× magnification) which are created by the roll contour during the rolling process. The surface profile in FIG. 3A also illustrates this surface roughness. However, in reality the peaks and valleys are not as sharp as shown since the vertical scale is 100 times greater than the horizontal scale (5000× versus 50×). The normal surface roughness of mill finished sheet provides some benefit to current transfer from the electrode to the work especially if the oxide film is thin. Removal of the oxide film by chemical means, however, does not significantly change the surface profile.

2. Abraded Sheet—Dilay et al., "Resistance Welding Aluminum for Automotive Production", SAE 770305, March 1977, found that Scotch Brite abrasion of aluminum sheet performed better in electrode life tests than did chemically cleaned sheet. This was evidently due in part to a change in surface roughness as well as reducing the surface oxide. To better understand the effects of surface roughening on welding performance we investigated three surface abrading techniques. These included Scotch Brite abrading, wire wheel abrading and belt sanding.

Scotch Brite Abrading did not perform well in preliminary welding trials, even though surface roughness was increased to more than 1.0 micrometers (40 microinches). We attribute this to the fact that this abrasion process imbedded oxides into the surface of the aluminum.

Figure 4:
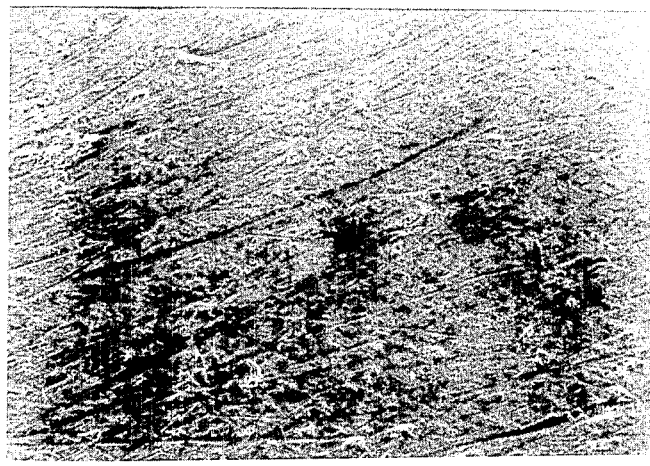

Wire Brush Abrading adequately removed the oxide but was difficult to control, giving various levels of roughness. FIG. 4 shows the sheet surface with light to medium abrasion at a magnification of 50×. In the area of medium abrasion, a typical roughness of 1.6 micrometers (62 microinches) RA was achieved; however, the spacing between peaks and valleys was significantly widened as shown in FIG. 3B. (Note that horizontal scale is 20× and vertical scale is 1000×.)

Figure 5:

Belt Sanding was found to be the most controllable method of surface abrading. On the basis of preliminary welding trials involving sheet roughnesses of 0.8, 1.3, 1.5, and 2.3 micrometers (30, 50, 60 and 90 microinches), the optimum roughness was found to be 1.3 micrometers (50 microinches). As shown in FIGS. 3C and 5 (FIG. 5 mag. = 500×), belt-sanded roughness was similar to mill finish sheet roughness except for having a higher RA. (Note the difference in horizontal and vertical scaling between 3A and 3C.)

3. Arc Cleaned Sheet—One of the most promising techniques of surface treatment at the electrode to sheet interface is arc cleaning. A method was proposed by Ashton and Rager, "An Arc-Cleaning Approach for Resistance Welding Aluminum", Welding Journal, September 1976, to arc-clean sheet at the point of welding. This was further refined by O'Brien and Titus, "Arc Cleaning for Joining Aluminum", SAE 830524, March 1983, who demonstrated that arc cleaning could be accomplished on a commercial scale at the resistance spot welder with little sacrifice in overall cycle time. Arc cleaning is also known as "cathodic cleaning", which term was used by Pattee, Amro and Randall of Battelle Memorial Institute in their papers in the April and May, 1968 issues of the Welding Research Supplement of the American Welding Society.

Figure 6:
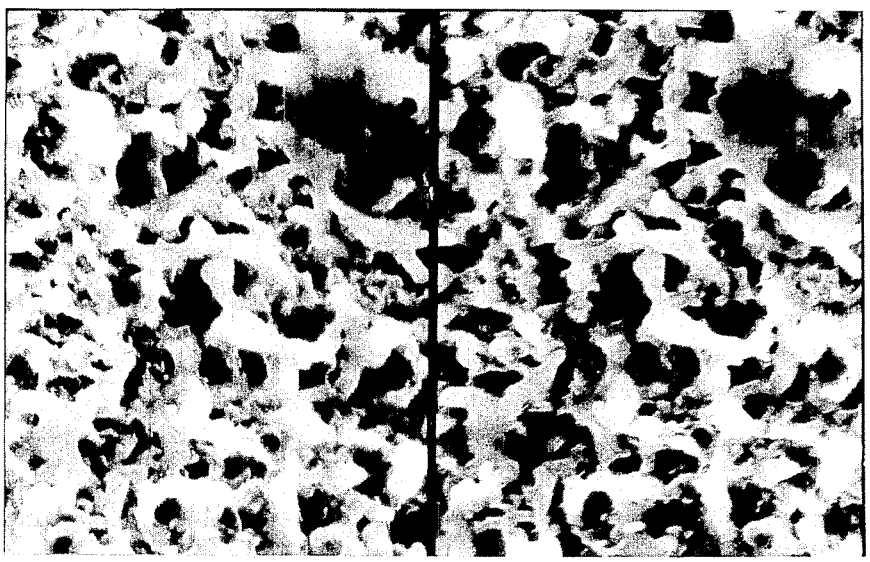
FIG. 6 is a stereo pair of photographs of an aluminum sheet surface at 5000× magnification.

For our welding trials, arc cleaning was accomplished by traversing strips of sheet with a GTAW welding torch operating in DC reverse polarity and superimposed continuous high frequency. The DC welding current was approximately 15 to 20 amperes, argon gas flow was 12 l/m (25 cfh) and torch travel speed was 6 to 19 mm/s (15 to 45 ipm) depending on surface conditions. As shown in FIGS. 3D and 6, arc cleaning does more than just remove surface oxide. It also roughens the surface to about 0.8 micrometers (30 microinch) RA, and more importantly creates high density pointed peaks rather than long ridges. These pointed peaks are mechanically unstable and easily compressed when contacted with the electrode. This consequently improves the electrical contact between the electrode and sheet, resulting in the lowest interface resistance of the treatments evaluated (see Table 1). An appreciation for the delicate nature of the arc cleaned surface can be gained by viewing the split photo in FIG. 6 with a stereo viewer.

Figure 7:
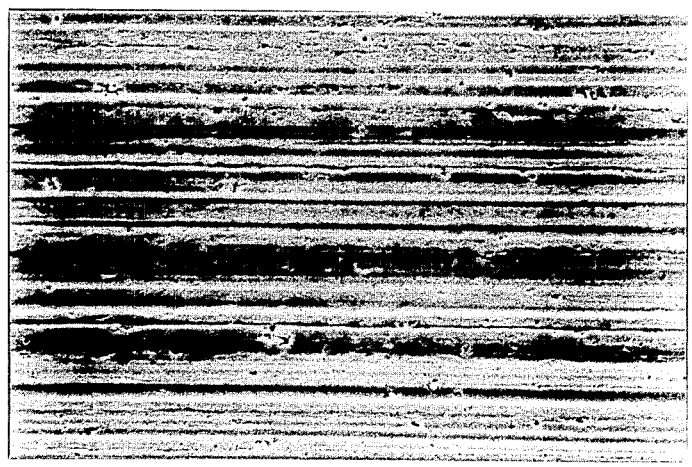

4. Conversion Coated Sheet—A chromium phosphate coating provides uniform resistance and chemical stability. Suitable techniques for applying such coatings are provided in U.S. Pat. No. 2,438,877 of F. P. Spruance, Jr. A suitable source of appropriate chemicals is the Alodine 401-45 product of Amchem Products of Ambler, Pa., U.S.A. Thinner conversion coatings [<50 mg/m$^2$(<5 mg/ft$^2$)] extend electrode life, whereas thicker coatings [>100 mg/m$^2$(>10 mg/ft$^2$)] considerably reduce electrode life for two sided sheet treatment. The surface of typical conversion coated sheet is shown in FIG. 7 at a magnification of 500×.

TABLE 1

Electrode/Sheet Contact Resistance for Different Surface Treatments

| Surface Treatment | Contact Resistance ($10^{-6}$ ohm) | |
|---|---|---|
| | Average | (Std. Deviation) |
| As-received mill finish | $2.97 \times 10^3$ | (497) |
| Chemical etching | 698 | (145) |
| Thin conversion coating | 158 | (68) |
| Belt-sanding with 1.2 μm RA | 110 | (34) |
| Arc-cleaning | 28 | (6) |

Measuring Condition: 10 measurements each from single interface contact with micrographically polished spherical radiused electrode under 2.75 KN force.

C. Screening Tests

1. Test Procedure—Screening tests were conducted on six combinations of treatments, using Class II spherical radiused electrodes.

2. Electrodes—Spherical radiused electrodes were used rather than truncated cone electrodes, to minimize the length of weld runs. Generally, spherical radiused electrodes produce about one-third to one-fifth the life of truncated cone electrodes. Verification tests were also conducted with truncated cone electrodes, as discussed later.

3. Material—All tests were conducted with either 6009-T4 or 6010-T4 aluminum alloy in thicknesses of 0.9 mm to 1.3 mm (0.036 to 0.050 in.). These alloys in T4 temper are available from Aluminum Company of America. For further detail consult Manual T9 of the Aluminum Association entitled "Data on aluminum alloy properties and characteristics for automotive applications", 4th Ed., Washington, D.C.; and SAE Paper No. 770307 entitled "New 6XXX-Series Alloys for Auto Body Sheet" by Evancho and Kaufman, Society of Automotive Engineers, Detroit 1977.

4. Equipment—A 150 KVA, single-phase AC frame welder with one gun from a typical multi-gun welding press was used for most of the testing. Some tests, however, were also conducted on a 400 KVA, single-phase AC scissors gun welder. An automatic strip advance mechanism centered and indexed pairs of strips into the guns to produce welds at a constant 25 mm (1 in.) spacing. Machine settings were maintained as constant as possible for a given sheet thickness. Weld current, however, was adjusted at the start of each test to obtain button setup diameter for a given thickness, as recommended in the Aluminum Association T10 Manual "Guidelines to Resistance Spot Welding Aluminum Automotive Sheet", Apr. 1982 edition. The present invention is likewise useful for DC resistance welding where again the goal is to minimize resistance at the electrode-work interfaces and provide a resistance at the faying interface effective for nugget formation without expulsion of molten material.

With the screening tests, both electrode life and weld quality were monitored. This was accomplished by either peel testing or tensile testing every weld.

5. Peel Tests—Full length×25 mm (1") wide strips containing 30 to 40 welds were 100% peeled, and the peeled button diameters were measured. Each strip was treated as though it were an automotive component. All buttons smaller than the minimum weld button diameters were considered unacceptable. This included "duds" (no buttons), "partial" (part of a button) and small but well-formed buttons. Electrode life was established when 20% or more of the buttons on the strip were smaller than the minimum setup diameter. This was classified as the "normal" automotive weld criterion for locations not subject to severe stresses and where weld failure would not seriously affect product performance, T10 Manual. Also recorded was the first weld failure or "critical location" and the strip where 10% failures occurred or "MVSS" location, T10 Manual.

6. Tensile Tests—Tensile shear tests were conducted periodically during each weld run to ensure weld shear strength met the Aluminum Association's T10 guidelines. Three tensile specimens were taken just after establishment of button setup diameter, after every 250 welds and after "normal" life was reached.

Figure 8:
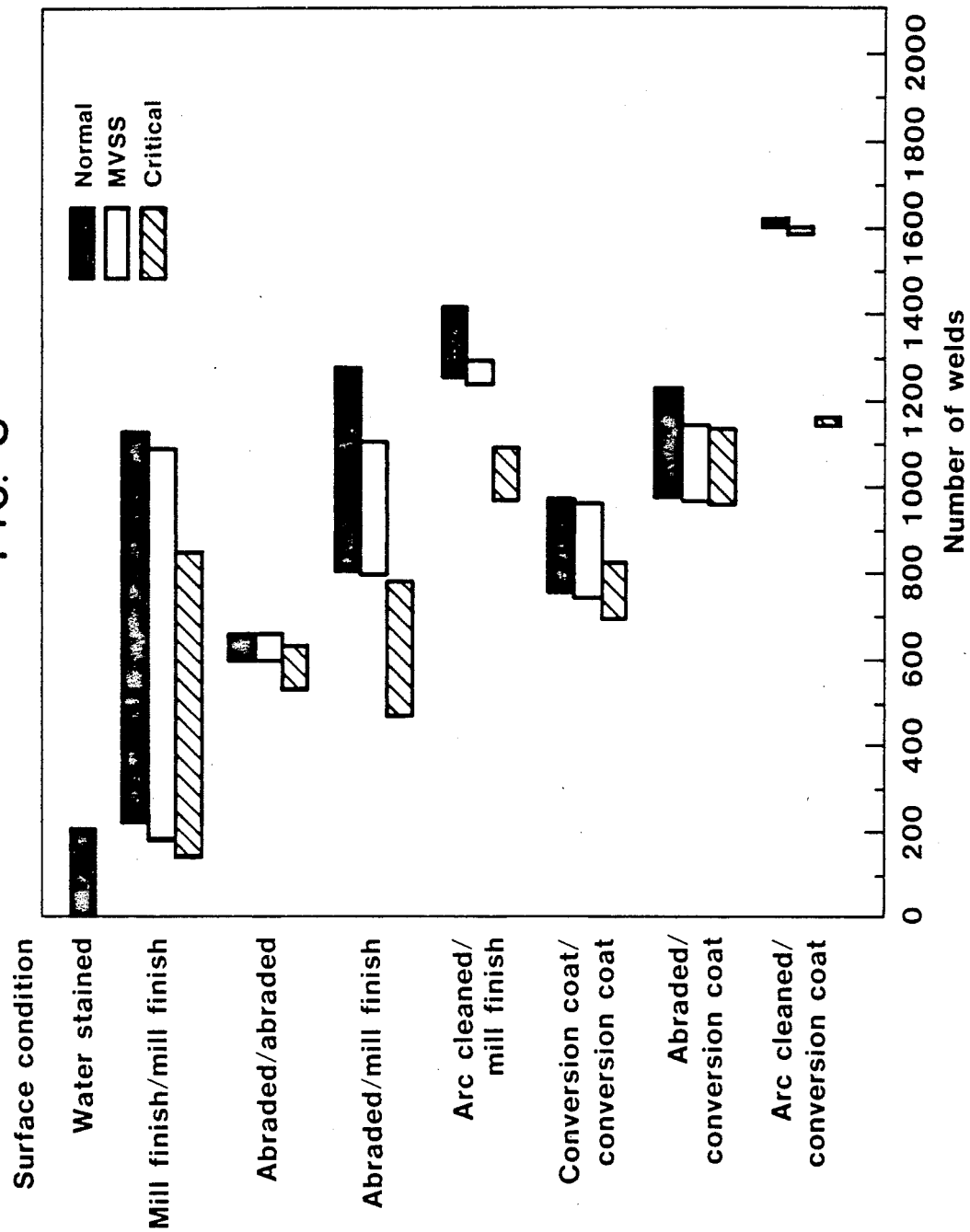
FIG. 8 is a bar chart showing number of welds achieved for different combinations of surface conditions.

7. Test Results—FIG. 8 shows a variety of surface conditions which provide either an identical resistance on both surfaces (for comparison to the present invention) or a differential condition per the present invention; i.e., low resistance on the outer surface and nugget-producing resistance on the inner surface. Also shown are screening results for water-stained sheet and a variety of mill-finished sheet conditions. If sheet is severely water-stained, it may be impossible to establish even the initial acceptable nugget condition. As-received mill finished sheet gave lives ranging from 200 to 1100 welds with the critical or first undersized button occurring over a wide range of values. By abrading both sides of the sheet, weld quality was held high throughout the runs but life ended abruptly around 650 welds. Abrading the outside of the sheet and leaving the inside as mill finished considerably extended life and offered some improvement in weld quality. Arc cleaning the outside of mill-finished sheet offered even greater improvements. Properly applied conversion coatings gave better results than two-sided abraded sheet. These results were, in fact, better than the 500-weld life reported by Hoch, "Joining of Aluminum Alloys 6009/6010", SAE 780396, March 1978. Best overall life was obtained with arc-cleaned/conversion-coated ($<5$ mg/ft$^2$) sheet, which provided over 1600 normal life welds and 1100 critical welds. One added benefit of conversion-coated faying surfaces was an increase of about 30% in the average weld tensile shear strength over that of mill-finished sheet. Button shape throughout the tests for mill-finished interfaces was variable, going from round to oblong, whereas abraded and conversion-coated interfaces produced near perfectly round buttons.

Tests were also conducted with 100 Å and 200 Å anodic oxide barrier layers at the faying surfaces with abraded surfaces on the outside of the sheet. After more than 2,000 welds, very little pickup or wear was evident on the electrodes. However, peeled button quality was inferior; erratic button shapes and undersized buttons were scattered throughout the tests. The lack of electrode deterioration was attributed to a sizable reduction in welding current compared with those required for other faying surface conditions. For example, abraded/mill finish sheet was welded at 70% heat whereas only 59% heat was required for abraded 200 Å barrier layer sheet. The inferior weld quality is believed due to the fact that the oxide layer does not break down uniformly at the faying surface, causing current transfer to become highly localized at oxide fracture sites. Weld quality evaluations for all screening tests are summarized in Table 2.

These results have the following implications. Electrode life can be greatly extended by minimizing heat generation at the electrode-to-sheet interfaces. Once a low resistance surface treatment such as abrading or arc cleaning is employed, further heat reduction can only be achieved by reducing welding current. This then requires the faying interface resistance to be high enough to produce sufficient heat for nugget formation. The faying surface treatment must provide the proper resistance and have the additional electrical characteristic of facilitating uniform current distribution. Aluminum oxide provides sufficient resistance, but its ceramic nature and high mechanical strength result in nonuniform fracture, current constriction and irregular nugget formation. Accordingly, a faying surface with controlled resistance and mechanical properties such as a conversion coating offer the greatest potential in achieving long electrode life and consistent weld quality.

TABLE 2

Screening test results using Class II spherical radiused electrodes and single phase AC welding.

| SURFACE TREATMENT | "NORMAL" LIFE RANGE | WELD QUALITY EVALUATION |
|---|---|---|
| Water Stained | 0–200 welds | Poor |
| Mill Finish/ Mill Finish | 200–1100 | Fair to Good |
| Abraded/Abraded | 600–650 | Excellent |
| Abraded/ Mill Finish | 800–1300 | Fair to Good |
| Arc Cleaned/ Mill Finish | 1250–1400 | Good to Excellent |
| Conv. Coat/ Conv. Coat | 750–1000 | Excellent |
| Abraded/ Conv. Coat | 950–1250 | Excellent |
| Arc Cleaned/ Conv. Coat | 1600 | Excellent |
| Abraded/ Barrier Layer | >2000 | Poor |

D. Simulated Production Welding Tests

Two extended electrode life tests were conducted using differential surface treatments, truncated cone electrodes and current stepping.

Figure 9:
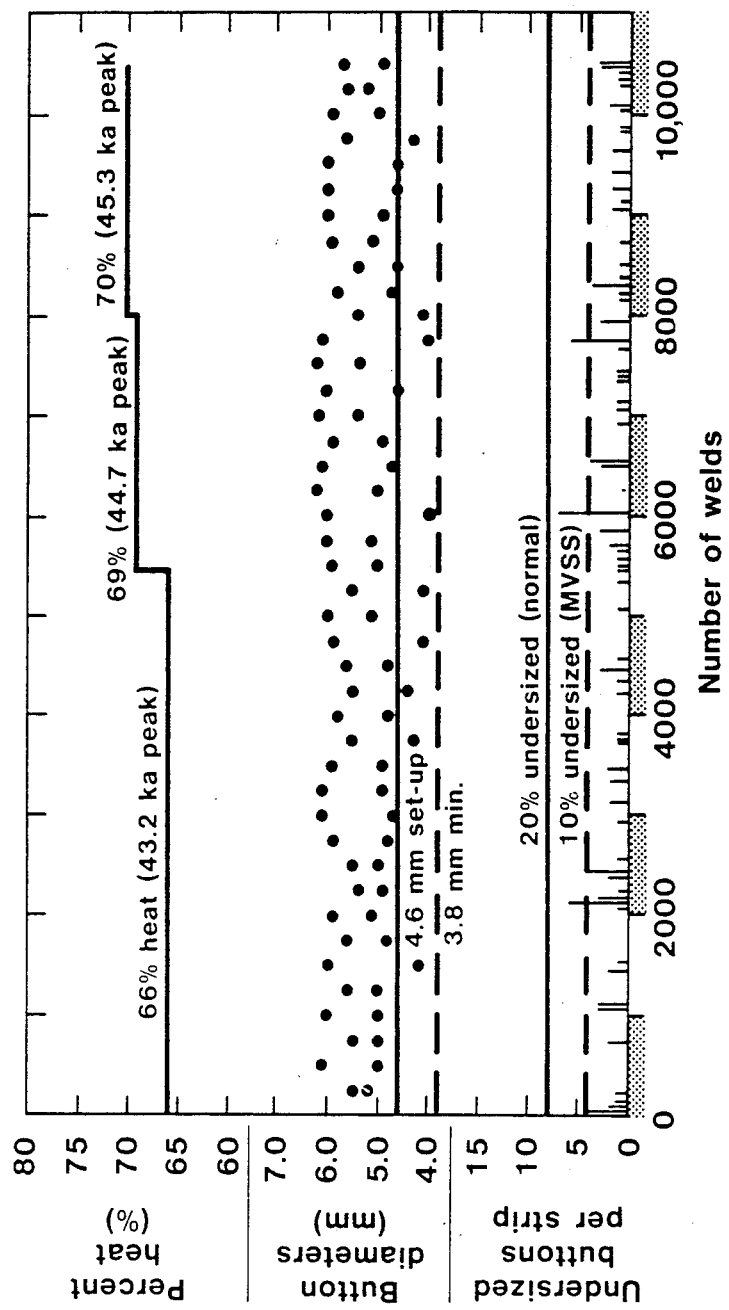
FIGS. 9-12 are charts illustrating test conditions and results.
Figure 10:
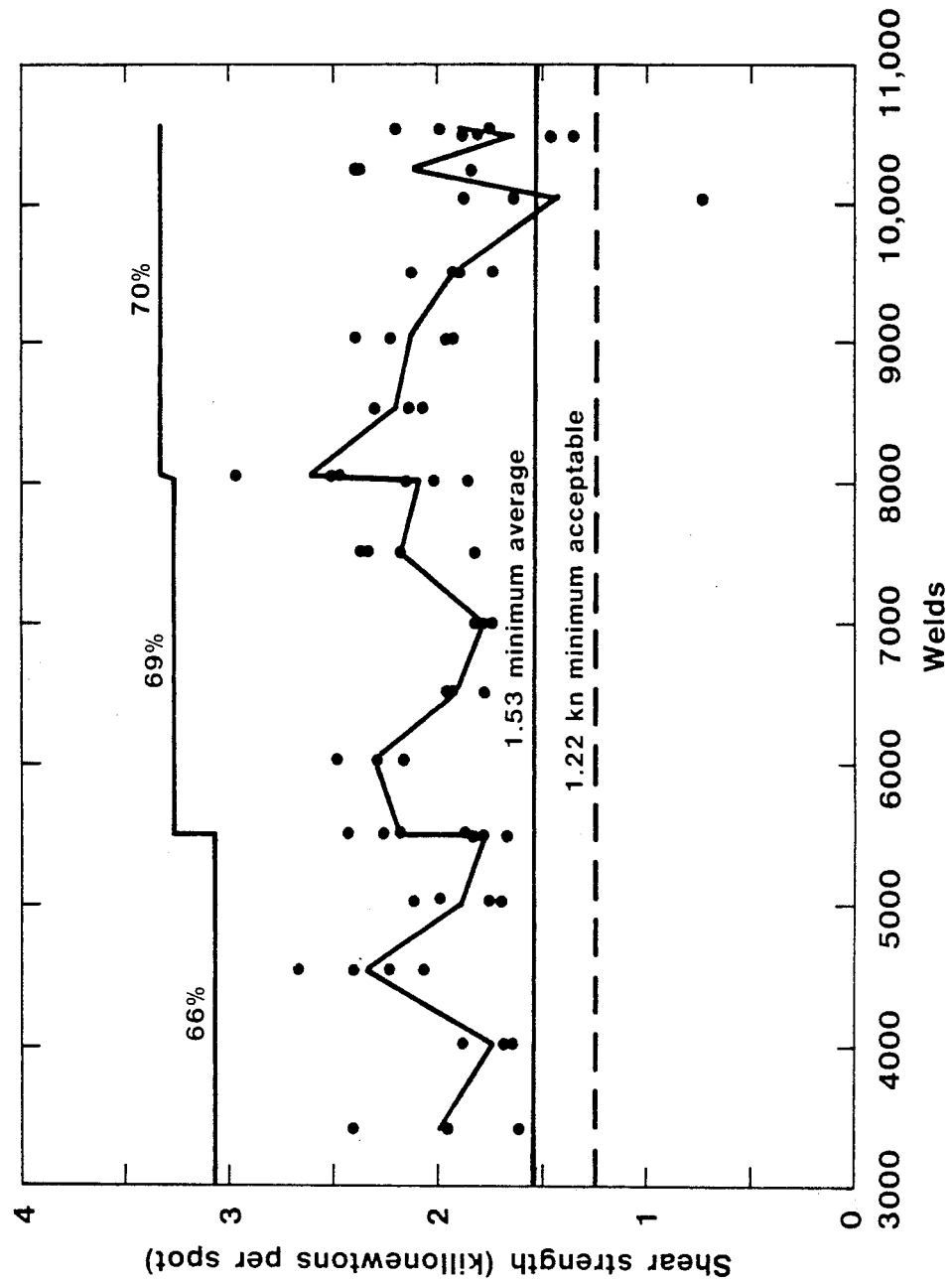

1. 10,000 Weld Test—In the first test, 0.9 mm thick (0.036 in.) 6010-T4 water stained sheet that had performed poorly in the mill finish/mill finish condition was wire brush abraded on the outside and welded for more than 10,000 welds on a set of Class II truncated cone electrodes (10). The results of this test are shown in FIG. 9, where percent heat, minimum and maximum button diameters and number of undersized buttons per strip are plotted against number of welds. It was necessary to step the current at 5500 and 8000 welds to maintain peeled button diameter. The test was stopped at 10,500 welds because prepared material was depleted and not because "normal" life had been reached. In general, minimum and maximum button diameters fell well above the 4.6 mm setup diameter requirement. Only 1.2% of the total welds were under the minimum diameter requirement. Of these, 40% were duds. The water-stained faying surfaces were thought to be responsible for the undersized buttons scattered throughout the test. The MVSS criterion was exceeded at 2000+ welds. As shown in FIG. 10, single spot tensile shear strengths were also consistently maintained above the minimum average for better than 10,000 welds.

Figure 11:
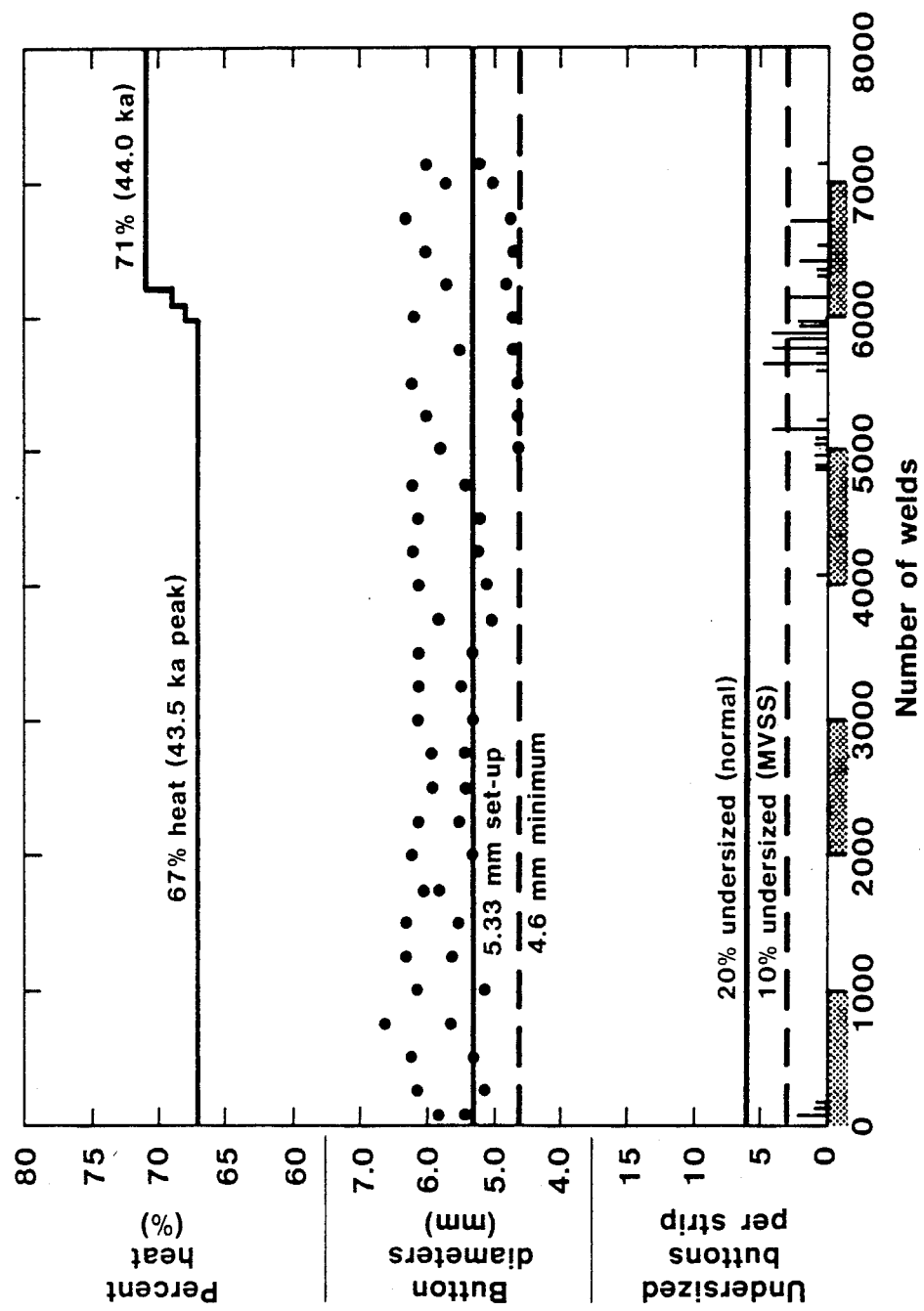
Figure 12:
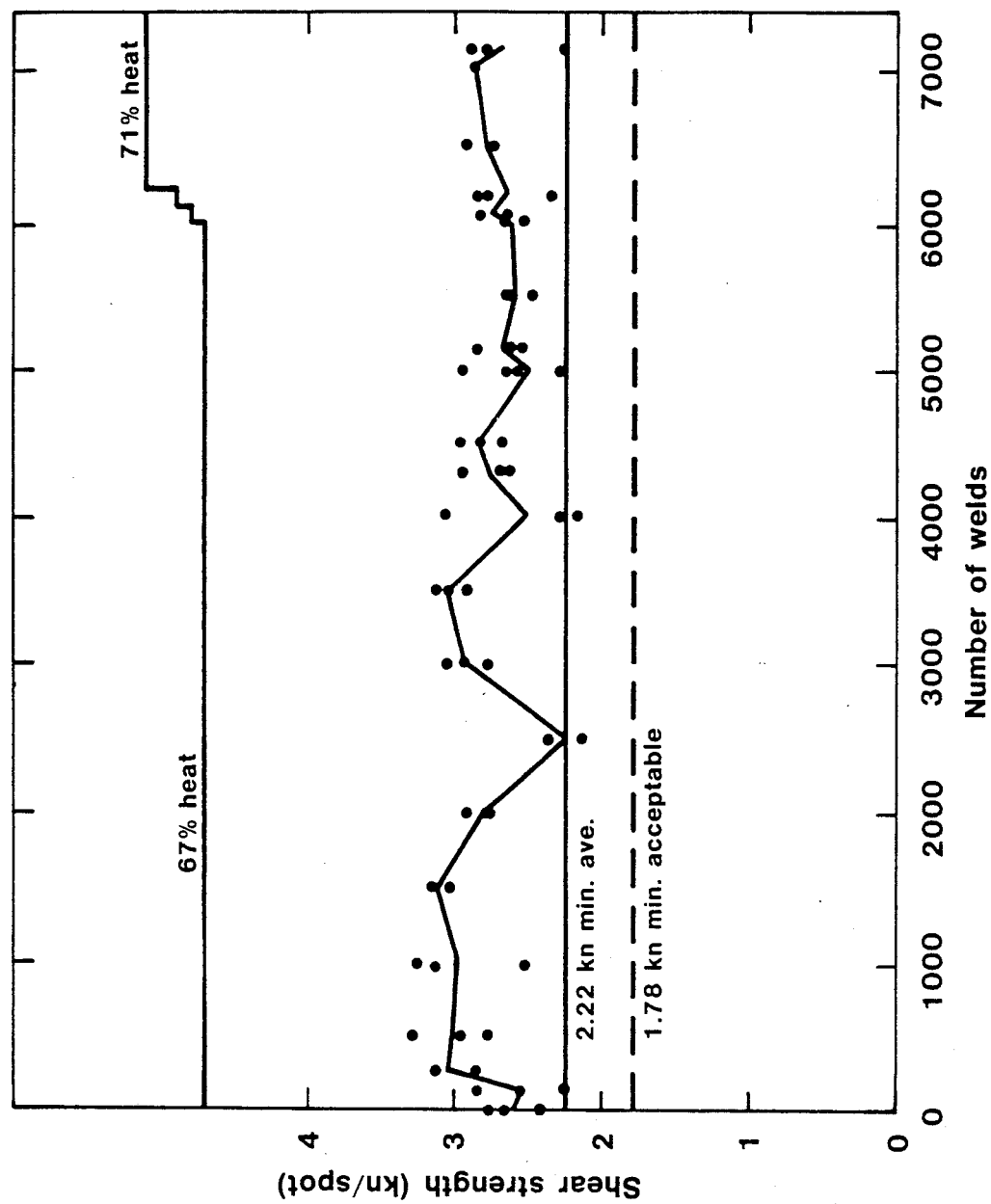

2. 7,000 Weld Test—An extended life test was also conducted on arc cleaned/conversion coated ($<5$ mg/ft$^2$) sheet as shown in FIG. 11. In this test 1.3 mm (0.050 in.) thick 6009-T4 sheet was welded for more than 7000 welds. This test was also terminated when prepared material was depleted and not because "normal" life had been reached. Throughout the test there were a total of 52 undersized buttons or 0.7% of the welds. Forty-five of these, however, were well-formed buttons with average diameters between 4 and 4.6 mm and none were duds. Many of the small nuggets could be attributed to a lower than desired current condition caused by line voltage fluctuations. Of significance was the fact that no undersized buttons occurred for almost 4000 welds. Current heat setting was first increased at 6000 welds, but should have been increased at 5000 welds to prevent the preponderance of undersized buttons between 5000 and 6000 welds. As shown in FIG. 12, single spot tensile shear strengths were maintained above the minimum average throughout the test.

E. Manufacturing Considerations

1. Lubricants and Part Forming—Consideration was also given to the effect of forming lubricant and the stamping operation on treated aluminum surfaces. Four types of forming lubricant were investigated, including both water-based and oil-based lubricants. Welding tests were conducted with lubricant freshly applied and after one to four days after application. The stamping operation was simulated with a draw bead simulator. This machine simulates the contact between an aluminum part and forming tools. Here 25 mm×0.8 to 1 meter long (1 in.×32 to 40 in.) strips were prelubricated and then pulled through the simulator at speeds of approximately 150 mm/s (360 ipm). A center die was adjusted to provide maximum wiping action and an exit die was adjusted to minimize curl of the exiting sheet.

In general, all four forming lubricants reduced electrode life of mill finish sheet on the average about 50 percent. Storage with lubricant applied tended to reduce electrode life even further, although results were not always consistent. Sheet pulled through the draw bead simulator performed about the same or slightly worse than sheet with one to four days' exposure after lubricant application.

Vapor degreasing of lubricant after the sheet was drawn improved electrode life, but not to the same point as surfaces having no lubricant applied.

2. Effect on Arc Cleaned Sheet—The effect of lubricant addition on arc cleaned (and abraded surfaces) was both helpful and harmful. Unlubricated surfaces tended to stick to the electrodes. With lubricant applied, sticking was greatly reduced. In addition, freshly applied lubricant produced inconsistent results on arc-cleaned surfaces. One test with a freshly applied water-based forming lube resulted in more than 2000 welds with no tip pickup and insignificant electrode wear. This suggests that a suitable lubricant applied at the point of welding would not only reduce electrode sticking, but could also provide extended electrode life. More work needs to be done in this area.

Water-based forming lubricants that were allowed to dry on arc-cleaned surfaces with two to three days' exposure drastically reduced electrode life by 80% (from an average of 1300 welds to only 250 welds). This was reduced even further to only 150 welds after draw bead simulation. Vapor degreasing of drawn sheet increased electrode life to only 600 welds. The draw bead operation apparently so smoothens the sheet surface that the electrode life advantage of roughened surfaces is greatly diminished.

Therefore, arc cleaning or surface roughening techniques to be effective must be applied at the point of welding. Both the forming lubricant and drawing operation would negate any advantage of supplying sheet with the outer surfaces roughened before final manufacture. A product fabricated with a controlled surface such as conversion coating or controlled mill oxide combined with a roughening technique, such as mechanical abrasion or arc cleaning applied immediately before welding, provides a practical solution to both extended electrode life and improved weld quality.

F. Conclusions

1. Interface resistances play an important role in resistance spot welding of aluminum. Surface resistance at the electrode-to-sheet interface should be minimized to improve current transfer, whereas a finite, well-controlled resistance is desirable at the faying interface to enhance nugget growth and maintain weld consistency.

2. Electrode deterioration is different between thick and thin oxides on the surface of aluminum. With thick oxide, current flows through scattered points of current constriction, causing excessive heat, local melting and alloying of copper and aluminum. With thin oxide, current conduction is more uniform and electrode deterioration is a gradual erosion process.

3. A low resistance at the electrode-to-work interface is best achieved by an abrasion, or roughening, process. The ideal topography is one that contains dense, pointed peaks as produced by arc cleaning.

4. A finite uniform resistance can be achieved at the faying interface by close control of mill oxide or by conversion coating. The electrical properties-resistance and current distribution of an interface coating are important in determining weld current requirements and good nugget formation.

5. Best overall welding results are achieved with arc-cleaned outer surfaces and conversion-coated inner surfaces. Screening test results with spherical radiused electrodes produced 1,600 welds. Long life tests with truncated cone electrodes and one current step produced more than 7,000 welds without a dud.

6. Both dried-on forming lubricants and the stamping operation are detrimental to resistance spot welding results. With mill finish sheet, electrode life is reduced by more than 50%. With arc-cleaned sheet life is reduced by 80%.

7. The most practical solution to provide extended electrode life and improved weld quality is a product fabricated with a controlled mill finish or conversion coated surface combined with an abraded or arc-cleaned surface applied immediately before welding.

Magnifications given herein are for the photographs and figures as originally submitted with the patent application.

What is claimed is:

1. A resistance welding method, including the steps of contacting electrodes to two parts to be welded together, faying the two parts at a location to be welded, and passing electrical current between the electrodes and through said location, wherein the improvement comprises performing, on the parts, the steps of roughening a surface of each of the parts to be welded for decreasing heat generation where an electrode makes contact and providing a uniform coating and a uniform surface resistance at the fayed location for generating heat to form a nugget without expulsion.

2. A method as claimed in claim 1, wherein the parts comprise aluminum.

3. A method as claimed in claim 2, wherein the parts comprise 6009 or 6010 aluminum alloy.

4. A method as claimed in claim 1, further comprising arc cleaning for accomplishing said surface roughening.

5. A method as claimed in claim 4, wherein the coating comprises a chromium phosphate coating.

6. A resistance welding method, including the steps of contacting electrodes to outer surfaces of two parts to be welded together, faying the two parts on inner surfaces at a location to be welded, and passing electrical current between the electrodes and through said location, wherein the improvement comprises providing, on the parts, a low, heat-minimizing resistance on an outer surface where an electrode makes contact and a uniform, nugget-producing resistance, higher than the heat-minimizing resistance, on an inner surface at the fayed location.

7. A method as claimed in claim 6 wherein the parts comprise aluminum.

8. A method as claimed in claim 7 wherein the parts comprise 6009 or 6010 aluminum alloy.

9. A method as claimed in claim 6 further comprising arc cleaning for roughening an outer surface where an electrode makes contact.

10. A method as claimed in claim 9 wherein a chromium phosphate coating is provided for said higher, nugget-producing resistance.

11. A resistance welding method, including the steps of contacting electrodes to two parts to be welded together, faying the two parts at a location to be welded, and passing electrical current between the electrodes and through said location, wherein the improvement comprises providing, on the parts, a differential resistance condition between the surface resistance of a part at an electrode contact versus the surface resistance of a part at the location of faying, the surface resistance of a part at the location of faying comprising a uniform coating, the surface resistance of a part at the location of faying being uniform.

12. A method as claimed in claim 11 wherein the parts comprise aluminum.

13. A method as claimed in claim 12 wherein the parts comprise 6009 or 6010 aluminum alloy.

14. A method as claimed in claim 11 further comprising arc cleaning for making a roughened surface at an electrode contact.

15. A method as claimed in 14, wherein a chromium phosphate coating is provided for the surface resistance at the location of faying.

16. A method as claimed in claim 5, wherein the parts comprise aluminum.

17. A method as claimed in claim 10, wherein the parts comprise aluminum.

18. A method as claimed in claim 15, wherein the parts comprise aluminum.

* * * * *